United States Patent [19]

Vinegar et al.

[11] Patent Number: 4,730,162

[45] Date of Patent: Mar. 8, 1988

[54] TIME-DOMAIN INDUCED POLARIZATION LOGGING METHOD AND APPARATUS WITH GATED AMPLIFICATION LEVEL

[75] Inventors: Harold J. Vinegar; Monroe H. Waxman, both of Houston, Tex.

[73] Assignee: Shell Oil Company, Houston, Tex.

[21] Appl. No.: 815,322

[22] Filed: Dec. 31, 1985

[51] Int. Cl.⁴ .............................................. G01V 3/20
[52] U.S. Cl. ................................. 324/362; 324/115; 324/366; 324/373
[58] Field of Search ............... 324/366, 373, 323, 336, 324/360–362, 115

[56] References Cited

U.S. PATENT DOCUMENTS

| | | | |
|---|---|---|---|
| 2,988,691 | 6/1961 | McAlister et al. | 324/360 |
| 3,181,056 | 4/1965 | Boissonnas | 324/323 |
| 3,315,155 | 4/1967 | Colani | 324/336 X |
| 3,895,289 | 7/1975 | Rickey et al. | 324/376 UX |
| 3,902,113 | 8/1975 | Bridges et al. | 324/366 X |
| 4,229,697 | 10/1980 | Petrosky et al. | 324/115 X |
| 4,329,641 | 5/1982 | Ikeda et al. | 324/115 |
| 4,359,687 | 11/1982 | Vinegar et al. | 324/362 X |
| 4,583,046 | 4/1986 | Vinegar et al. | 324/373 |

Primary Examiner—Gerard R. Strecker

[57] ABSTRACT

The stimulus signal for an induced polarization logging system is presented to the formation intermittently, alternately being applied and removed as a square wave of alternating polarity, and the response signal amplification level is time gated with the stimulus signal.

30 Claims, 7 Drawing Figures

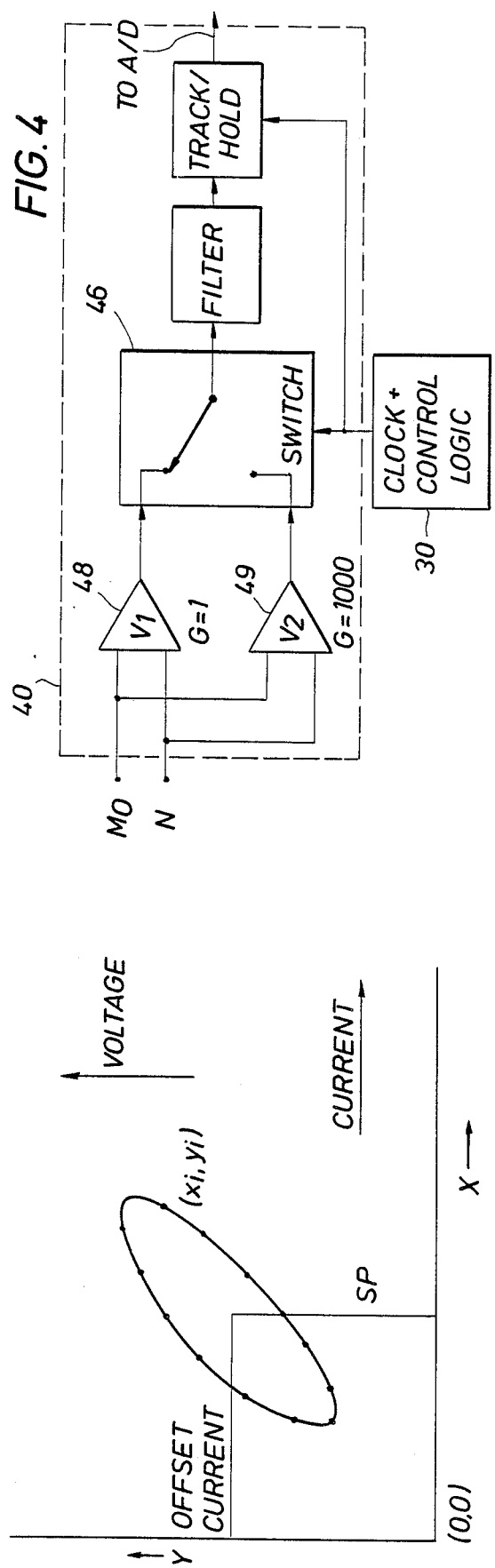

TIME-DOMAIN INDUCED POLARIZATION LOGGING METHOD AND APPARATUS WITH GATED AMPLIFICATION LEVEL

BACKGROUND OF THE INVENTION

The present invention pertains to an induced polarization logging system such as described in U.S. Pat. No. 4,359,687 by Harold J. Vinegar and Monroe H. Waxman, issued Nov. 16, 1982, and assigned to the assignee of the present invention. In this patent there is described an induced polarization logging tool and method for determining the cation exchange capacity per unit pore volume $Q_v$, electrolyte conductivity $C_w$, and water saturation $S_w$ of shaly sand formations using in situ measurements. In particular, the patent describes a logging tool having an insulated sonde with current and return electrodes and means to determine the in-phase conductivity, the quadrature conductivity, and the phase shift. The induced polarization logging tool which is thus described provides greatly improved means for evaluating a formation penetrated by a borehole.

The system described in the above-noted '687 patent is a "frequency-domain" induced polarization system. That is, an alternating current (AC) signal is continuously applied to the formation at a given frequency, and the resulting measurements (made either continuously or by close interval sampling) may be represented, for example, by a graph such as shown in FIG. 2. In this representation, the data corresponds to a series of points on an ellipse. As shown, the vertical offset of the center of the ellipse represents the self-potential of the formation, and the horizontal offset represents the offset current. Various frequencies can be selected from time to time, and by proper control of the AC signal input a zero current offset can even be achieved. The semi-major and semi-minor axes of the ellipse enable the in-phase and quadrature conductivity to be determined, as described in the above-noted patent.

As powerful as frequency-domain induced polarization logging has become, there are nevertheless several limitations. One, for example, is that at any given time the measurement is done with a single, discrete frequency. Another limitation is that the formation response signal is read at the same time that the stimulus voltage is applied. However, the amplitude of the out-of-phase portion of the signal is several orders of magnitude smaller than the in-phase signal portion. Typically, therefore, the amplifier gain may have to be 1,000 times less than desirable to prevent overloading in order to record both in-phase and out-of-phase portions of the signal simultaneously. This leads to an undesirably small signal-to-noise ratio for the out-of-phase or quadrature portion of the signal from which the quadrature conductivity is determined. A third limitation has to do with restrictions on the rate at which a borehole can be logged. With frequency-domain logging, particularly at lower frequencies, the tool can move an appreciable distance—perhaps well into another formation—during a single AC current cycle. Since the resistivity of the other formation may be appreciably different, and the out-of-phase voltage is measured simultaneously with the in-phase voltage, the small out-of-phase response will be substantially altered by the resistivity of the new formation.

A need thus remains for an improved method and apparatus for induced polarization logging. Ideally, such a method and apparatus will provide a substantially improved dynamic range for receiving the out-of-phase response signal, will be capable of simultaneously studying the formation response at a plurality of frequencies, and will be able to log a borehole continuously at substantially improved logging speeds.

SUMMARY OF THE INVENTION

Briefly, the present invention meets the above needs and purposes with an induced polarization logging apparatus and method operating in the time domain, with amplifier gain switching during the off-portion of the current cycle. In the preferred embodiment, the applied currrent is presented to the formation intermittently, preferably as a square wave of alternating polarity, with independently variable current-on and current-off times. In such a process, the applied signal and response signal are temporally (i.e., time) separated. This has a distinct advantage in that a substantially greater dynamic range is enabled during the out-of-phase signal measurement. That is, when the stimulus signal is removed, the amplifier gain can be boosted as appropriate for a full reading of the formation out-of-phase response signal. The improved dynamic range means that fewer bits are required for the downhole analog-to-digital converter which therefore enables simpler design and greater stability.

Another advantage of time-domain logging is that the pulsed stimulus signal, upon analysis, is in fact composed of multiple frequencies, as a simple Fourier analysis will show. In the preferred embodiment, therefore, the results of induced polarization logging for several different frequencies can be provided simultaneously in a single pass, preferably analyzing the response by means of Laplace transform.

Time-domain induced polarization logging has still another advantage in increased borehole logging speed. That is, when the stimulus signal is turned off, any subsequent response measured from the formation will understandably come from the stationary formation, not from the moving tool. Thus, a rapidly moving tool may actually progress somewhat into another formation as the response signal is being measured, without confusing the measurement. This results directly from the time separation of the resistivity or in-phase response (applied stimulus or changing) from the polarization or quadrature response (decay).

It is therefore an object of the present invention to provide a substantially improved induced polarization logging method and apparatus; such a method and apparatus in which the induced polarization logging is done in the time domain; which includes a current source for alternately applying a substantially constant current to the earth formation and then removing the current to induce a time-domain polarization response therein; which includes means for measuring the amplitudes and phases of the voltages and currents induced in the formation by the current source; which temporally gates the amplification level of the measuring means substantially with the cycling of the current source; which then determines parameters, such as the in-phase and quadrature conductivity, of the formation; and to accomplish the above objects and purposes in an inexpensive, uncomplicated, durable, versatile, and reliable method and apparatus readily suited to the widest possible utilization in the analysis of earth formations, particularly those penetrated by a borehole.

These and other objects and advantages of the invention will be apparent from the following description, the accompanying drawings, and the appended claims.

BRIEF DESCRIPTION OF THE DRAWINGS

FIG. 2 is a plot of prior art measurement signals obtained with a frequency-domain logging tool;

FIG. 3 is a plot of a time-domain induced polarization logging wave form, the time increasing from right to left;

FIG. 4 shows in greater detail one gain switchable voltage amplifier useable in the logging tool shown in FIG. 1, and having two amplifiers therein of different gains;

DESCRIPTION OF THE PREFERRED EMBODIMENT

Figure 1:
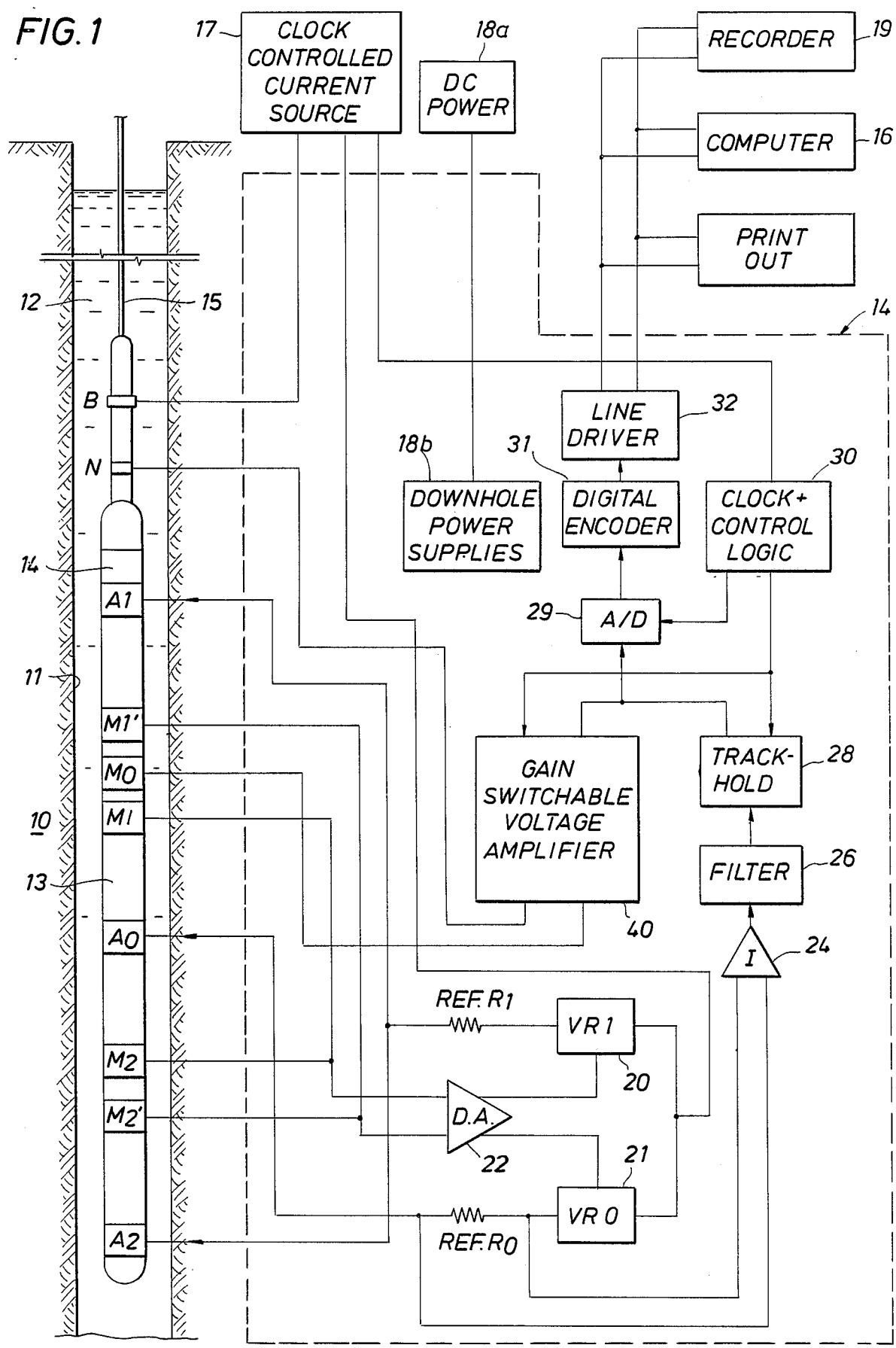
FIG. 1 is a figurative cross-sectional view of a borehole penetrating several earth formations, and an induced polarization logging tool according to the present invention located therein.

With reference to the drawings, the new and improved time domain induced polarization logging apparatus, and the method therefor according to the present invention, will be described. FIG. 1 shows a representative embodiment of an induced polarization logging tool or sonde 13 located in a borehole 11 for investigating subsurface earth formations 10 traversed by the borehole. Borehole 11 is filled with a conductive drilling fluid or mud 12, as is common practice in the industry.

Sonde 13 is similar to ones such as described in U.S. Pat. Nos. 4,359,687 (above) and 4,583,046, the disclosures of which are incorporated herein by reference. Except for the gain switchable amplifier 40 in FIG. 1, the circuit is substantially the same as that described in the '046 patent and will therefore not be described in detail here.

Thus, the sonde housing, which encloses a downhole electronics unit 14 containing the various electrical circuits used in the operation of the sonde, is suspended from the surface of the earth by a multi-conductor cable 15. At the surface, cable 15 is reeled in and out of the borehole by a conventional winch and drum mechanism (not shown), and tool control, data processing and computation, and recording are performed by a surface clock-controlled current source 17, electronics 16, and recorder 19, in customary fashion.

In contrast with prior art induced polarization logging systems and methods, however, the present invention does not apply a steady, single-frequency AC current to the formation. Instead, as is shown in FIG. 3 (a plot of an actual time-domain induced polarization logging wave form), a substantially constant current signal is alternately applied to the earth formation and then removed. The applied signal or stimulus is shown by the current line 25 (FIG. 3), and the resultant induced time-domain polarization response in the formation 10 (amplified by a factor of 100) is shown by line 27 (FIG. 3). (The voltage represented by line 27 is actually off scale during the current-on time, and only the decay voltage is therefore shown.) As may be seen, in the preferred embodiment the applied current alternates in polarity. Also apparent from FIG. 3, the period or interval 33 during which the current is applied to the formation does not necessarily have the same duration as the "rest" or current-off interval 34.

Analytically, the time-domain waveform recorded by recorder 19 and electronics 16, as appropriate, is a convolution of the current waveform with the receiver and formation time response functions:

$$v(t) = \rho(t) * i(t) * r(t) * (G_v/K) \tag{1}$$

where v(t) is the voltage waveform, $\rho(t)$ is the formation complex resistivity time response, i(t) is the current waveform, r(t) is the receiver system time response, $G_v$ represents the voltage gain in the receiver amplifier, K is a tool geometry factor, and the asterisks indicate convolution.

Fourier transformation of v(t) gives:

$$V(f) = \rho(f) \cdot I(f) \cdot R(f) \cdot (G_v/K) \tag{2}$$

where V(f) is the spectrum of the voltage waveform, $\rho(f)$ is the transfer response of the formation, I(f) is the spectrum of the applied current, and R(f) is the transfer response of the receiver system.

In order to separate the formation complex resistivity response, the waveform of the transmitted current is preferably recorded through a non-inductive downhole current resistor $R_o$ for calibration. Fourier transformation of this waveform then gives a current calibration function C(f):

$$C(f) = R_o \cdot I(f) \cdot R(f) \cdot G_c \tag{3}$$

where $G_c$ represents the gain of the current amplifier in the receiver. Normalizing V(f) by C(f) gives $$\rho(f) = \frac{V(f)}{C(f)} \cdot \frac{KG_cR_o}{G_v} \tag{4}$$

Similar results can be achieved, of course, using a Laplace transform.

If the formation response is linear, the time-domain and frequency-domain modes give identical results. A main advantage of the time-domain operation, however, is that the induced polarization decay voltage is measured during the time when the current is off. That is, the measured signal is temporally (time) separated from the applied signal. Thus, a change in resistivity, as when the tool moves into a different formation, has a substantially smaller effect on the time-domain measurement. This provides for considerably increased logging speeds without loss of accuracy. Moreover, separate amplifiers with different gains can be used for measuring the charging and decay parts of the time-domain waveform (simply allowing the more sensitive decay-monitoring amplifier to saturate during the charging interval), or a single amplifier properly time gated to different corresponding gains can similarly be used. Still another embodiment is the use of a single logarithmic amplifier with a dynamic range of several decades, such an amplifier effectively providing automatic temporal amplification gain gating but without the need for an outside clock-and-control logic connection. Such a logarithmic amplifier would be substituted for amplifier 23 in the '046 patent, and would consist of a DC-coupled high input impedance logarithmic amplifier. Thus, the dynamic range of the induced polarization measurement is not limited by the requirement of simultaneous resistivity measurement, as it is in frequency-domain measurements. Rather, the amplification level can be time gated (i.e., varied and controlled), either actively or passively as preferred, in responce to or in coordination withe the cycling of the current source.

Figure 5:
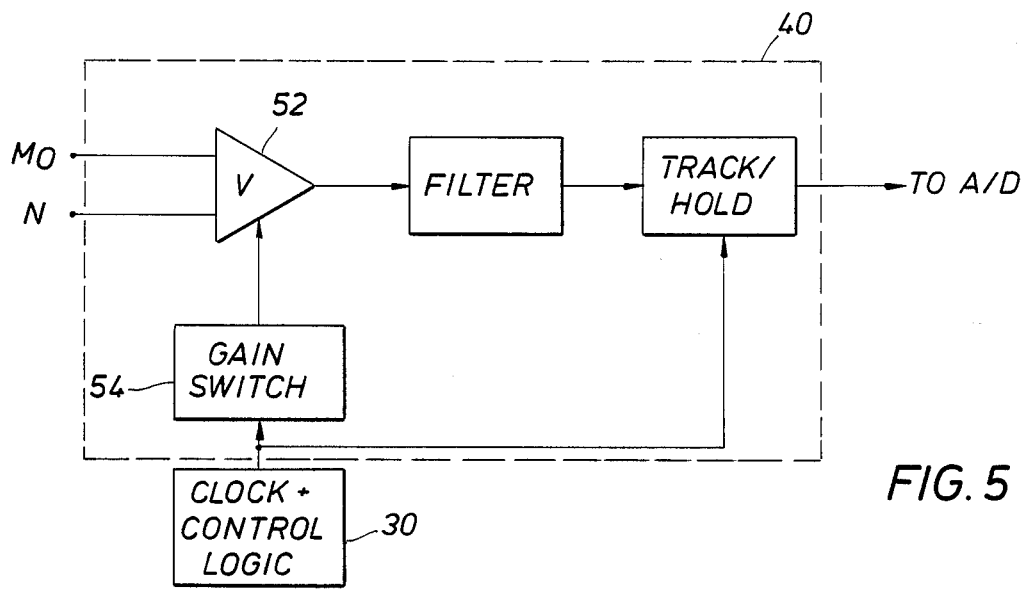
FIG. 5 shows another suitable gain switchable voltage amplifier having a single amplifier with adjustable feedback for changing the amplifier gain.
Figure 6:
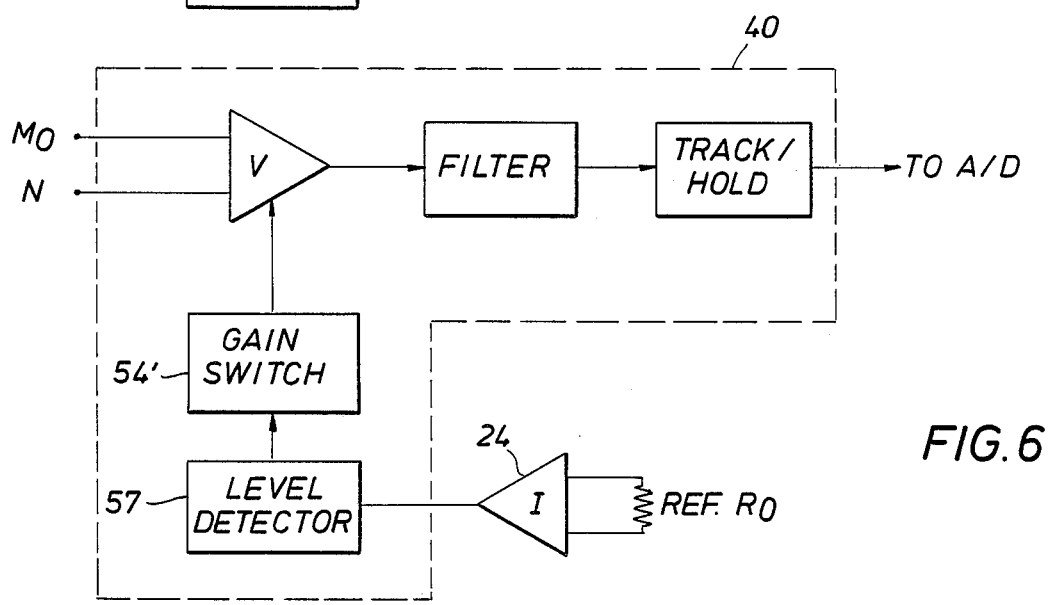
FIG. 6 shows still another gain switchable voltage amplifier coupled to the current amplifier to detect current-on and current-off times for changing the gain level.
Figure 7:
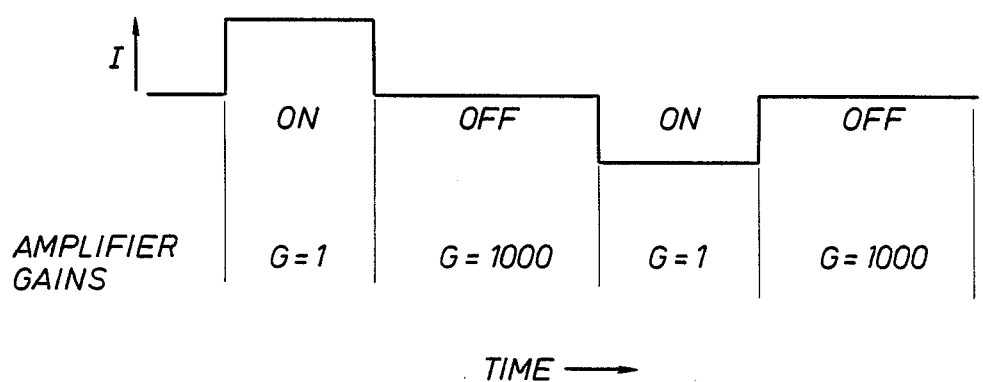
FIG. 7 is a representative showing of the amplifier gains corresponding to the periods of current on and current off.

FIGS. 4–6 show representative circuits for accomplishing the time gated changes in the amplification level. Each is a gain switchable voltage amplifier 40, the operation of which should be readily apparent from the drawing figures. Thus, in FIG. 4, in which the clock and control logic 30 from FIG. 1 have been reproduced for clarity of illustration, a switch 46 toggles back and forth between the low level amplifier (gain =1) 48 and the high gain amplifier (gain =1000) 49, in synchronism with the current-on and current-off cycles of the tool.

FIG. 5 shows a circuit similar to that in FIG. 4, except that a single amplifier 52 is used, and its gain is switched by a gain switch 54 under control again of the tool clock-and-control logic. Gain switch 54 switches an appropriate resistor in the feedback loop of amplifier 52.

FIG. 6 shows still another suitable gain switchable voltage amplifier, having a gain switch 54' similar to that of 54 in FIG. 5. Gain switch 54' is under the control of a level detector 57 which detects change in the current flow, reported by current amplifier 24 (FIG. 1).

As explained above, the present invention thus actually measures the formation induced polarization response at several different frequencies, namely, the frequencies present in the applied square wave stimulus signal, which frequencies can then be subsequently revealed in known-technique Fourier analysis of the response waveform. The amplitudes and phases of the time domain voltages induced in the formation by the current source means following removal of the applied current are thus measured, and the measurements and their analysis can be readily faciliated by a Fourier transform, as also explained above. The quadrature conductivity of the formation is thus readily determined. The resistivity of the earth formation is readily determined from the steady-state conductivity of the formation, which is quickly and stably reached during the interval that the constant current stimulus signal is being applied. Further, the spontaneous potential of the formation is simply the DC term coming out of a Fourier transform of the formation response.

The present invention thus provides a substantially improved method and apparatus for induced polarization logging, having a substantially improved dynamic signal response range, being capable of simultaneously studying the formation response at a plurality of frequencies, and being able to log a borehole continuously at substantially improved logging speeds. The invention is thus not only highly sensitive, but is also readily suited to wide use in a great variety of formation analysis situations. For example, in addition to being readily adaptable to use in a borehole, the invention can also be used for detailed analysis of formation samples brought to the surface. Also, while the invention has been described primarily with respect to a stimulus signal composed of a controlled current applied to the formation, it will be clear that a predetermined voltage signal could be applied instead, in which case the current flow into the formation would be monitored.

Therefore, while the methods and forms of apparatus herein described constitute preferred embodiments of this invention it is to be understood that the invention is not limited to these precise methods and forms of apparatus, and that changes may be made therein without departing from the scope of the invention.

What is claimed is:

1. A time-domain induced polarization logging apparatus for measuring parameters of an earth formation, comprising:

(a) current source means for alternately applying a substantially constant electrical stimulus signal to the earth formation and then removing said stimulus signal to induce a time-domain polarization response therein, (b) amplifying measuring means for measuring the amplitudes and phases of the time-domain voltages induced in the formation by said current source means, (c) amplification control means coupled to said current source means and said measuring means for temporally gating the amplification level of said measuring means between predetermined gain levels substantially with the cycling of said current source means, and (d) means coupled to said measuring means for generating a log as a predetermined function of said measurements.

2. The apparatus of claim 1 wherein said current source means further comprises means for alternately applying said stimulus signal for a first predetermined time period and then removing said stimulus signal for a second predetermined time period different from said first period.

3. The apparatus of claim 1 wherein said current source means further comprises means for applying a stimulus signal which alternates in polarity.

4. The apparatus of claim 3 wherein said measuring means further comprises means for determining the spontaneous potential of the formation.

5. The apparatus of claim 4 wherein said means for determining the spontaneous potential of the formation further comprises means for determining the spontaneous potential as a function of the DC term coming out of a Fourier transform of said formation response.

6. The apparatus of claim 1 wherein said measuring means further comprises means for making said measurements by measuring the formation response signal as a signal temporally separated from said stimulus signal.

7. The apparatus of claim 1 wherein said measuring means further comprises means for making said measurements substantially simultaneously at several different frequencies.

8. The apparatus of claim 7 wherein said measuring means further comprises means for making said measurements by means of a Fourier transform.

9. The apparatus of claim 1 wherein said amplifier control means further comprises at least two amplifiers operating substantially continuously, one for making said measurements at a first predetermined gain level while said current source means is applying said stimulus signal to the earth formation, and the other for making said measurements at a second predetermined gain level greater than said first gain level during those periods when said current source means has removed said applied stimulus signal.

10. The apparatus of claim 1 wherein said amplifier control means further comprises a single amplifier operating substantially continuously and having at least two gated predetermined gain levels, one said level for making said measurements at a first predetermined level while said current source means is applying said stimulus signal to the earth formation, and the other for making said measurements at a second predetermined level greater than said first gain level during those periods when said current source means has removed said applied stimulus signal.

11. The apparatus of claim 1 wherein said amplifier control means further comprises a single logarithmic amplifier having a dynamic range of several decades.

12. The apparatus of claim 1 wherein said measuring means further comprises means for determining the resistivity of the earth formation substantially as a function of the steady-state conductivity thereof.

13. The apparatus of claim 1 wherein said measuring means further comprises means for determining at least the quadrature conductivity of the formation.

14. The apparatus of claim 1 further comprising recording means for recording said measurements.

15. A time-domain induced polarization logging apparatus for use in a borehole for measuring parameters of an earth formation penetrated by the borehole, comprising:
(a) a sonde adapted for movement through such a borehole,
(b) current source means in said sonde for alternately applying a substantially constant electrical stimulus signal to the earth formation and then removing said stimulus signal to induce a time-domain polarization response therein, said stimulus signal alternating in polarity, and said current source means alternately applying said stimulus signal for a first predetermined time period and then removing said stimulus signal for a second predetermined time period different from said first period,
(c) amplifying measuring means coupled to said sonde and including means for measuring, substantially simultaneously at several different frequencies and as a signal spatially separated from said stimulus signal, the amplitudes and phases of the time-domain voltages induced in the formation by said current source means following said removal of said stimulus signal, said measuring means including means for making said measurements by means of a Fourier transform, and means for determining the spontaneous potential of the formation as a function of the DC term coming out of a Fourier transform of said formation response, means for determining the resistivity of the earth formation substantially as a function of the steady-state conductivity thereof, and means for determining at least the quadrature conductivity of the formation,
(d) amplification control means coupled to said current source means and said measuring means for controlling the amplification level of said measuring means,
(e) said amplifying measuring means including at least one amplifier operating substantially continuously and having at least two temporally gated predetermined gain levels, one said level for making said measurements at a first predetermined level while said current source means is applying said stimulus signal to the earth formation, and the other for making said measurements at a second predetermined level greater than said first gain level during those periods when said current source means has removed said applied stimulus signal, and
(f) recording means for recording said measurements.

16. A time-domain induced polarization logging method for measuring parameters of an earth formation, comprising:
(a) alternately applying a substantially constant electrical stimulus signal to the earth formation and then removing the signal to induce a time-domain polarization response in the formation,
(b) measuring, at controllable amplification levels, the amplitudes and phases of the time-domain voltages thus induced in the formation,
(c) temporally gating the amplification levels, during said measuring between predetermined gain levels substantially with the cycling of said stimulus signal, and
(d) generating a log as a predetermined function of the measured amplitudes and phases.

17. The method of claim 16 further comprising alternately applying the stimulus signal for a first predetermined time period and then removing the stimulus signal for a second predetermined time period different from the first period.

18. The method of claim 16 further comprising applying a stimulus signal which alternates in polarity.

19. The method of claim 18 further comprising determining the spontaneous potential of the formation.

20. The method of claim 19 further comprising determining the spontaneous potential as a function of the DC term coming out of a Fourier transform of the formation response.

21. The method of claim 16 further comprising making the measurements by measuring the formation response signal as a signal spatially separated from the stimulus signal.

22. The method of claim 16 further comprising making the measurements substantially simultaneously at several different frequencies.

23. The method of claim 22 further comprising making the measurements by means of a Fourier transform.

24. The method of claim 16 wherein said step of temporally gating the amplification level further comprises measuring the amplitudes and phases of the voltages and currents induced in the formation with at least two amplifiers operating substantially continuously, one for making the measurements at a first predetermined gain level while the stimulus signal is being applied to the earth formation, and the other for making the measurements at a second predetermined gain level greater than the first gain level during those periods when the applied stimulus signal has been removed.

25. The method of claim 16 wherein said step of temporally gating the amplification level further comprises measuring the amplitudes and phases of the voltages and currents induced in the formation with a single amplifier operating substantially continuously and having at least two gated predetermined gain levels, one level for making the measurements at a first predetermined level while the stimulus signal is applied to the earth formation, and the other for making the measurements at a second predetermined level greater than the first gain level during those periods when the applied stimulus signal has been removed.

26. The method of claim 16 wherein said step of temporally gating the amplification level further comprises measuring the amplitudes and phases of the voltages and currents induced in the formation with a single logarithmic amplifier having a dynamic range of several decades.

27. The method of claim 16 further comprising determining the resistivity of the earth formation substantially as a function of the steady-state conductivity thereof.

28. The method of claim 16 further comprising determining at least the quadrature conductivity of the formation.

29. The method of claim 16 further comprising recording said measurements.

30. A time-domain induced polarization logging method for use in a borehole for measuring parameters of an earth formation penetrated by the borehole, comprising:
   (a) alternately applying a substantially constant electrical stimulus signal to such an earth formation for a first predetermined time period and then removing the stimulus signal for a second predetermined time period different from the first period to induce a time-domain polarization response therein,
   (b) alternating the polarity of the applied stimulus signal,
   (c) by using at least one amplifier operating substantially continuously and having at least two predetermined gain levels temporally gated with the stimulus signal, one such level for making measurements at a first predetermined level while the stimulus signal is being applied to the earth formation, and the other for making measurements at a second predetermined level greater than the first gain level during those periods when the applied stimulus signal has been removed, measuring, substantially simultaneously at several different frequencies and as a signal temporally separated from the stimulus signal, the time-domain amplitudes and phases of the voltages induced in the formation following the removal of the stimulus signal, the measurements being made by means of a Fourier transform,
   (d) determining the spontaneous potential of the formation as a function of the DC term coming out of a Fourier transform of the formation response,
   (e) determining the resistivity of the earth formation from the applied current and the steady-state voltage response,
   (f) determining at least the quadrature conductivity of the formation from the formation response during the period when the stimulus signal has been removed, and
   (g) recording the measurements of the formation.

* * * * *